United States Patent [19]
Bell et al.

[11] Patent Number: 5,764,633
[45] Date of Patent: Jun. 9, 1998

[54] METHOD AND SYSTEM FOR TRANSFERRING DIGITAL TELEPHONE CIRCUITS

[76] Inventors: David T. Bell, 512 S. Rusk, Weatherford, Tex. 76086; George G. Galloway, HC51 Box 179G, Graford, Tex. 76449; Mark W. Hastings, 2909 Oykey Trail; Paul R. Siglinger, 1415 Westwood Dr., both of Weatherford, Tex. 76087; James W. Thompson, 403 Principio, Mineral Wells, Tex. 76067

[21] Appl. No.: 508,387

[22] Filed: Jul. 31, 1995

[51] Int. Cl.⁶ .................. H04L 12/50; H04Q 11/00
[52] U.S. Cl. .............. 370/386; 370/243; 370/246; 379/90.01; 379/88; 455/553; 455/567
[58] Field of Search .................. 370/360, 363, 370/357, 359, 386, 387, 388, 243, 246, 248, 293, 458, 519; 379/58, 61, 56, 59, 90, 201, 387, 96, 345, 93, 94, 90.01, 88; 455/553, 567

[56] References Cited

U.S. PATENT DOCUMENTS

| | | |
|---|---|---|
| 4,611,324 | 9/1986 | Giacometti et al. .............. 370/243 |
| 4,710,976 | 12/1987 | Wakabayashi et al. .............. 370/246 |
| 4,937,812 | 6/1990 | Itoh et al. .............. 370/246 |
| 5,365,578 | 11/1994 | Buzbee et al. .............. 379/90.01 |

*Primary Examiner*—Wellington Chin
*Assistant Examiner*—Melissa Kay Carman
*Attorney, Agent, or Firm*—Geoffrey A. Mantooth

[57] ABSTRACT

A digital telephone circuit is transferred from an old line to a new line. Before the transfer, a first stage delay circuit is inserted, wherein the delay of the data is incrementally adjusted to match the delay of a data control element. The data control element is then inserted in series with the data on the old line. The data control element incrementally adjust the delay and amplitude of the data on the old line to match that of the data on the new line. The incremental adjustments to delay and amplitude are within the specifications of the circuit, so as to minimize interruptions to the circuit. Interruptions are also minimized when the circuit is transferred to the new line. The data control element also introduces variations into the data at an upstream location. These are detected at a downstream location and are used for testing and communication purposes. The variations are removed from the data at the downstream end. The new line is used for communications between the transfer locations before the transfer. After the transfer occurs, the old line is used for communications.

28 Claims, 11 Drawing Sheets

METHOD AND SYSTEM FOR TRANSFERRING DIGITAL TELEPHONE CIRCUITS

FIELD OF THE INVENTION

The present invention relates to methods and systems for transferring digital telephone circuits from one channel to another.

BACKGROUND OF THE INVENTION

Telephone systems in general use both copper wires and optical fibers to carry telephone signals. Much of the physical equipment already in place is copper wire and its associated equipment. Traditionally, a pair of copper wires was used to carry only a single conversation. Now, a single pair of copper wires can carry multiple conversations by way of multiplexing. Multiplexing increases the capacity of the telephone system by allowing the system to carry more calls. One type of multiplexing uses a digital carrier signal. The audio information is digitized and sent over the wires on a digital carrier. An example of a standard digital carrier that has been adopted by the telephone industry is DS1 (sometimes referred to as T-1). This is a pulse code modulation carrier. A telephone line that carries a DS1 carrier is referred to as a DS1 circuit. DS1 circuits operate at a data rate of 1.544 million bits per second.

Telephone companies frequently need to transfer DS1 circuits from one telephone line to another. For example, a telephone company may need to reroute a DS1 circuit because of construction around the old line or to replace deteriorating lines or electronic equipment. In addition, the telephone company may be upgrading its equipment from copper wires to fiber optic cables. Fiber optic systems have greater bandwidth, signal capacity and reliability. Thus, a DS1 circuit is commonly transferred from copper wires to a fiber optic transmission system.

Many DS1 circuits are used as critical data circuits linking hospitals, financial institutions, corporations, and air traffic control facilities. Interruptions of any such circuit is expensive and disruptive. Thus, there is a need to transfer DS1 circuits from old lines to new lines, without interrupting the telephone service being provided.

Service interruption can occur if variations in either propagating time or amplitude of the signal are introduced. Variations in propagating time are, unfortunately, easy to introduce during the transfer. This is due to fact that between the transmitting end and the receiving end of a DS1 circuit, there is a significant amount of hardware that processes the data. For example, with copper wires, repeaters are located periodically down the line. On fiber optic cables, electronic transducers (for converting electrical signals into optical signals and vice versa) are present, as well as repeaters. All of this processing takes time. The time that data takes to travel from one end of the line to the other end is referred to as propagation delay, or transport lag. Different systems have different delays. Fiber optic systems are typically slower than copper wire systems, because of the transducers.

If a DS1 circuit is transferred from one line to another without accounting for the different delay times, then there will either be data lost (because of an overlap of data as seen by the receiving end of line), or there will be a large gap with extra data present. Either the loss of data or the presence of extra or redundant data causes confusion at the receiving end, resulting in errors.

In addition, unless the old line and the new line are closely aligned to within about one eighth of a bit before the transfer occurs, the receiving end will not accept the data from the new line. This is referred to as a phase mismatch. If a phase mismatch occurs, the receiving end must then reset itself, and initiate a new synchronization so as to receive the out-of-phase data. This causes data bits to be lost, because during the time that the receiver is resetting itself, it cannot receive data.

Variations in the amplitude of the data bit stream can also produce bit errors that interrupt the circuit. Any abrupt change in amplitude can produce a transient that produces such bit errors.

Another problem lies in the need to replace repeaters. Repeaters age and fail and thus need to be replaced. The telephone industry refers to this practice as "repeater cutaround". Prior art transfer systems are unable to transfer a line having a repeater therein. This is because the transfer systems utilize tone signals that are unable to pass through the repeaters.

Complicating the transfer further is the fact that copper wire systems carry not only data but electrical power as well. The repeaters in a copper wire system are powered by DC current that is carried by the same wires that carry the data. The DC current makes a loop along one side (for example, the transmit side) of the DS1 circuit, across a repeater to the other side (for example, the receive side) and back along that other side. Thus, if one side of the DS1 circuit is transferred, provisions must be made to maintain electrical power to the DS1 circuit, or the other side of the circuit will be interrupted. Likewise, if the new span of wires to which the circuit is being transferred requires power, provisions must be made to power the new span. This type of situation would arise, for example, in a repeater cutaround.

In addition, a transfer set that makes the transfer must be capable of testing all of the processes involved in the transfer to insure that no errors have been made and that the new DS1 circuit actually works. This is because if the new DS1 circuit is not operating properly, or if the two ends of the transfer are not made on the same circuit, then the transfer will not be transparent to the customer using the line and an interruption in service will result.

SUMMARY OF THE INVENTION

It is an object of the present invention to provide a method and system for transferring digital telephone circuits in such a manner so as to minimize interruptions in service of the circuits.

It is a further object of the present invention to provide a method and system for transferring of digital telephone circuits in such a manner so as to minimize variations in transport lag and amplitude of the data during the transfer of the circuit.

It is a further object of the present invention to create a traceable signal that can pass through repeaters on a telephone line that is to be transferred.

It is a further object of the present invention to communicate between transfer units over the new line before the transfer occurs and then to communicate between the transfer units over the old line after the transfer occurs.

The present invention transfers a digital telephone circuit from a first communications channel between a transmitter and a receiver to a second communications channel between the transmitter and the receiver. The first communications channel carries pulse code modulated information having a first propagation delay. The second communications channel carries pulse coded modulated information having a second propagation delay. The pulse code modulated information on the first communications channel has pulses that occur within specified intervals of time. The invention incrementally adjusts the first propagation delay on the old line such that for each incremental adjustment, the pulses continue to occur within the specified intervals of time. The incremental adjustment of the first propagation delay is continued and accumulated until the first propagation delay matches the second propagation delay. After the first propagation delay has been matched to the second propagation delay, the circuit is transferred from the first communications channel to the second communications channel.

The present invention allows easy identification of the new line at both ends of the transfer. A transfer unit is connected to the new line at one end. That transfer unit generates a pulse code modulated signal that is unique sounding. This signal then travels down the new line from one end, through any repeaters present on the line, to the other end. At the other end of the line, the technician uses a digital signal identifier to locate the new line. The digital signal identifier, which is described in U.S. Pat. No. 5,140,614, provides an audible signal that is a representation of the carrier signal, so that the technician can hear the unique signal. In addition, the digital signal identifier provides discrimination against common mode noise, thereby ignoring coupled signals on a line.

Once a transfer unit is connected to the old and new lines at each end of the transfer, a data control circuit is inserted in series with the data on the old line. However, the data control circuit introduces delay to the data on the old line. Therefore, to prevent interruption of the circuit, the data is first passed through a first stage delay circuit. The first stage delay circuit incrementally adjusts the delay of the data on the old line to match the delay of the data control circuit. The incremental adjustments do not interrupt the telephone circuit. This adjustment is done at both units, as each unit has a first stage delay circuit and a data control circuit.

When the delay of the data passing the first stage delay circuit matches the delay that is caused by the data control circuit, the data is then switched so as to pass through the data control circuit. This switch occurs in each transfer unit, so that there is now a data control circuit inserted in series with the data at each transfer unit, and thus at each end of the transfer.

Once the data control circuits are inserted in series with the data, several operations can be performed in order to make the transfer between the old line and new line with a minimum of data loss. One such operation is the manipulation of the data in order to verify that both transfer units are connected to the same old line. At the upstream transfer unit, the data control circuit manipulates the data (such as by varying the delay of bits). This manipulation is detected at the downstream transfer unit data control circuit, wherein connection of both transfer units to the same old line is verified. The downstream transfer unit data control circuit also removes the variations, so as not to interrupt the telephone circuit.

The data can also be manipulated to measure the difference in delay between the old and new lines.

Once the difference in delay is known, the data control circuit in one of the transfer units incrementally adjusts the delay of the data on the old line to match the delay of the data on the new line. The phase of the data on the old line is incrementally adjusted to match the phase of the data on the line. Also, the amplitude of the data on the old line is incrementally adjusted to match the amplitude of data on the new line.

The adjustments to delay, phase, and amplitude of the data are made incrementally so as not to interrupt the telephone circuit. Pulse code modulation data is transmitted on a line within one or more circuit specifications. The specifications insure that the receiver at the far end of the line will receive the data. The specifications include parameters relating to time of occurrence and amplitude of individual bits. The time of occurrence and amplitude parameters are typically given as a range of values. By incrementally adjusting the delay and phase of the data, each individual adjustment only varies the bits in the data stream by an amount that is within the specified time of occurrence parameter for the telephone circuit. Likewise, by incrementally adjusting the amplitude of the data, each individual adjustment only varies the bits in the data stream by an amount that is within the specified amplitude parameter for the telephone circuit. Because the individual adjustments have not deviated from the specification from the circuit, the circuit is not interrupted. The individual adjustments to delay are repeated as many times as necessary to provide a cumulative change in delay that can exceed the original delay by an amount greater than the specified parameter. The same is true for phase and amplitude.

This incremental adjustment technique is used by the first stage delay circuit when adding delay to match the delay of the data control circuit in each transfer unit. The technique is also used by the data control circuit to match the delay, phase, and amplitude of the data on the old line to the data on the new line. The technique is also used when manipulating the data to verify the connections of both transfer units to the same old line.

Once the delay, phase, and amplitude of the data on the old line match the delay, phase, and amplitude of the data on the new line, the transfer can take place. Switching to the new line from the old line occurs between bits in the data stream. Because the data on the old line matches the data on the new line, with respect to data, phase, and amplitude, the transfer does not interrupt the telephone circuit. In other words, the receiver is unable to detect a circuit transfer because after the transfer, the data continues to arrive at the receiver in an uninterrupted manner.

Before the transfer takes place, the transfer units of the two ends of the new line communicate with each other over the new line. The transfer units provide both voice and data communications. After the transfer of the telephone circuit to the new line, the communications between the two transfer units takes place on the old line.

DESCRIPTION OF THE PREFERRED EMBODIMENTS

Figure 1:
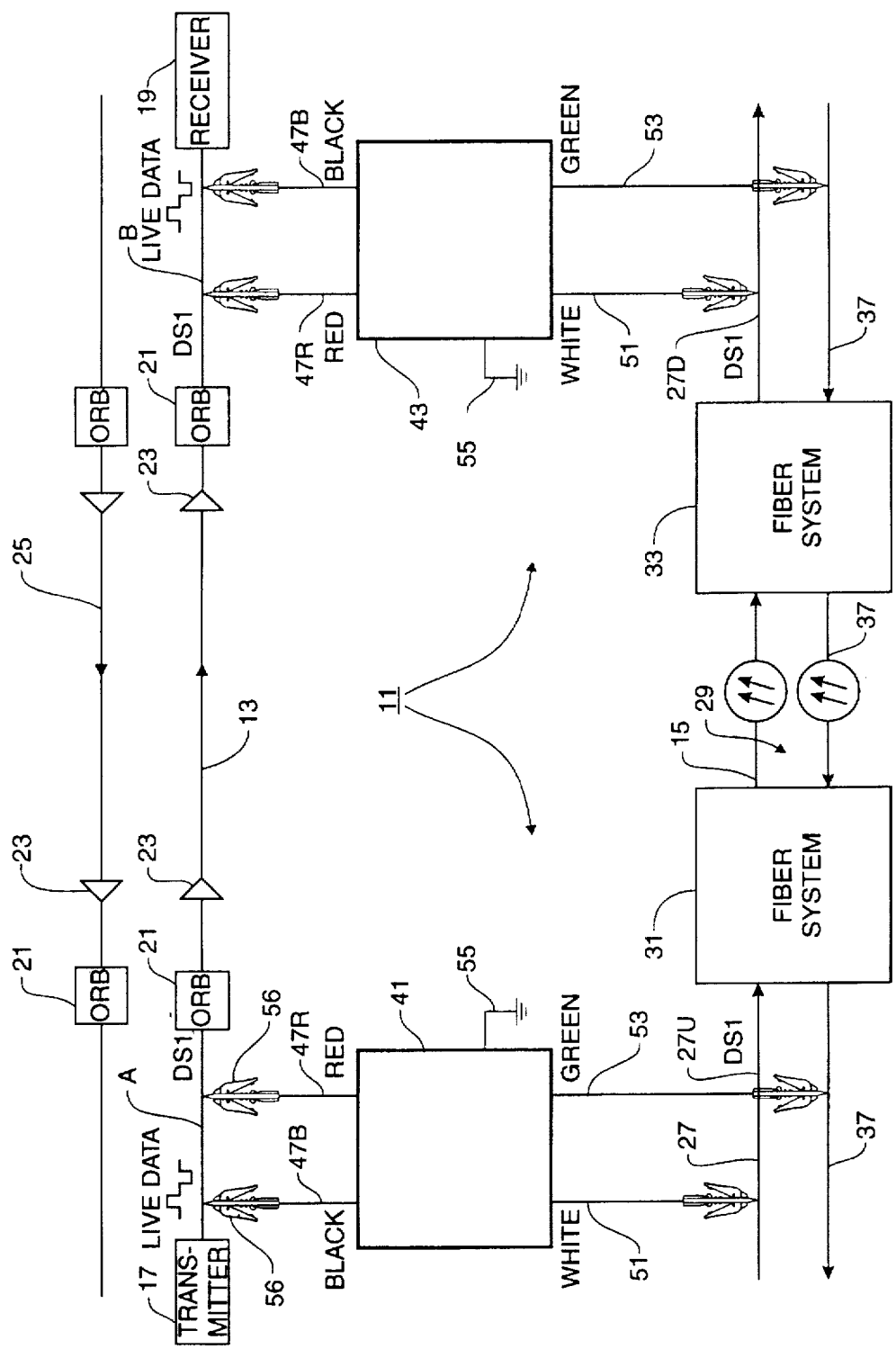
FIG. 1 is a block diagram showing the system of the present invention, in accordance with a preferred embodiment, connected to telephone lines.

In FIG. 1, there is shown a block diagram of the system 11 of the present invention, in accordance with a preferred embodiment, connected to telephone lines. The system 11 is used to transfer telephone circuits from an old line 13 (a first communications channel) to a new line 15 (a second communications channel). The old line 13 carries digital data, such as DS1 data.

The individual telephone lines provide one way communications channels. Thus, in the old line 13, data flows from left to right (with reference to the orientation of FIG. 1). A transmitter 17 is connected to the left end of the old line 13, while a receiver 19 is connected to the right end of the old line. The transmitter 17 places data onto the old line while the receiver 19 receives the data from the old line.

When transferring the circuit from the old line to the new line, only a portion of the old line is actually bypassed. That portion of the old line between the transmitter 17 and an upstream location A is kept in service, as is that portion of the old line between a downstream location B and the receiver 19. The portion of the old line that is between the upstream and downstream locations A and B is bypassed by the transfer, with the data being rerouted from the old line 13 at the upstream location A to the new line 15 and along the new line to the downstream location B, wherein the data is routed back to the old line.

The present invention transfers the circuits so that a minimal amount of disturbance to the signal occurs. For example, suppose that the message "Now is the time . . . " is to be transmitted by the transmitter 17 to the receiver 19. The phrase is of course coded into ones and zeros for transmission along the old line. The first word "Now" is transmitted over the old line 13, just like all of the preceding data. Suppose that immediately after the "Now" signals pass by the upstream location A, the circuit is transferred to the new line 15. This causes the data "is the time . . . " to be carried by the new line 15.

The new line 15 may introduce delay into the data. For example, if the new line utilizes a fiber optic cable, delay is inserted into the telephone circuit by conversion processes. Specifically, the data is converted from electrical signals into optical signals and vice versa. Delays created by this processing cause the data to arrive at the receiver 19 later in time than if the data had been transmitted over the old line 13. Because of the delay introduced by the new line, the receiver 19 might see something like: "Now # @ $ & ! % * ()is the time . . . ". Additional information, which is nonsensical, has been inserted into the data. Alternatively, the portion "is the time" might be lost because the receiver will be thrown out of synchronization with the incoming new line data and unable to receive this portion of the message. Either way, service has been interrupted and error has been introduced into the message.

With the present invention, a data control circuit is inserted in series with the DS1 data at each location. That is to say that the data is routed through the data control circuit. This is done without interrupting service in the DS1 circuit. Because the data control circuit may cause delay variations, before the data control circuit is inserted in series with the data, the data is routed through a first stage delay circuit. The first stage data delay circuit incrementally varies the delay in the data to match the delay provided by the data control circuit. The size of the increments are selected so as to be within acceptable tolerances to the receiver so as not to disrupt the operation of the receiver 19. Once the delay of the data matches the delay of the data control circuit, the data is routed through the data control circuit. Because there is no variation in delay when routing the data through the data control circuit, there is no interruption in service.

Once the data control circuit is inserted in series with the data, it is possible to work within acceptable DS1 parameters and shift the data, control amplitude of the data, switch the data between bits, and even manipulate the data, all of which operations are used to transfer from the old line to the new line without an interruption of service.

Compensation is made for any delay caused by new line, so that when the circuit is transferred from the old line to new line, the receiver is fed the same data that is transmitted by the transmitter. The present invention accomplishes this by incrementally introducing delay into the data that is sent along the old line. The size of the increments are selected so as to be within acceptable tolerances to the receiver so as not to disrupt the operation of the receiver 19. The data on the old line is synchronized and matched, bit for bit, to the data on the new line. Thus, when the transfer is made from the old line to the new line, no data is lost or repeated. In addition, the phase of the data on the old line is matched to the phase of the data on the new line, as seen at the downstream end of the transfer. After the transfer, the data arriving at the receiver is in phase with the data that arrived at the receiver before the transfer. Thus, synchronization of the receiver with the incoming data is maintained.

In addition, the present invention compensates for any changes to the amplitude of the data that is introduced by the new line, so that the receiver is not disrupted by the transfer from the old line to the new line due to any transients in amplitude. The present invention accomplishes this by incrementally adjusting the amplitude of the data on the old line so as to match the amplitude of the data on the new line, as seen at the downstream end. The size of the amplitude adjustments are within acceptable tolerances of the receiver.

In addition, the data stream can be manipulated for testing and communication purposes. In the upstream unit, the data control circuit can add bits, or add or subtract delay to the data. Information can be encoded and transmitted downstream in this manner. At the downstream location, whatever informational variations to the data that were introduced are taken out of the data so that the receiver receives only the data produced by the transmitter.

In addition, power to the old circuit is maintained after the transfer. Thus, if one side of the old circuit is transferred, operation of the other side is not interrupted by a loss of power. Also, the new line is pre-powered before the transfer so as to minimize any interruption in service caused by power transients on the new line.

Referring to FIG. 1 again, the telephone circuits will now be described with more particularity. As discussed above, the data in the old line 13 travels from left to right (with reference to FIG. 1) between the transmitter 17 and the receiver 19. The old line 13 is a pair of copper wires. The data passes through office bay repeaters (ORB) 21, as well as field repeaters 23, which repeaters maintain an adequate signal strength along the line. There is a second line 25 for communicating data in the opposite direction (that is, from right to left with reference to FIG. 1). The data in the second line 25 is produced by a transmitter (not shown) and passes through office bay repeaters and field repeaters. The data on the second line is received by a receiver (not shown). Each line has a tip conductor and a ring conductor.

The new line 15 is a combination of copper wires 27 and fiber optic cable 29. The copper wires connect to fiber optic systems 31, 33. A fiber system 31, 33 includes DS1 transmit and receive circuitry (typically for multiple DS1 lines), as well as fiber optic transducers. Thus, preceding from left to right in FIG. 1, there is an upstream end of copper wires 27U which is connected to a fiber optic system 31. The fiber optic system 31 converts the electrical signals from the upstream copper wire 27U into light signals that are transmitted over the fiber optic cable 29 from left to right. One or more repeaters could be located along the fiber optic cable 29. The fiber optic system 33 converts the light signals into electrical signals for transmission over a downstream copper wire 27D. The copper wires 27U, 27D have tip and ring conductors.

There is also a fiber optic channel 37 for sending data from right to left with reference to FIG. 1.

The present invention can transfer telephone circuits between copper lines, between copper and fiber optic lines, between fiber optic lines, and between other types of communication media such as microwave links.

The system 11 of the present invention includes a first transfer unit 41 and a second transfer unit 43. The first unit 41 is located at one of the locations A or B along the old line, while the second unit 43 is located at the other location. In FIG. 1, the first unit 41 is shown at the upstream location A, while the second unit 43 is shown at the downstream location B. The first and second units 41, 43 are substantially similar to each other.

Figure 2:
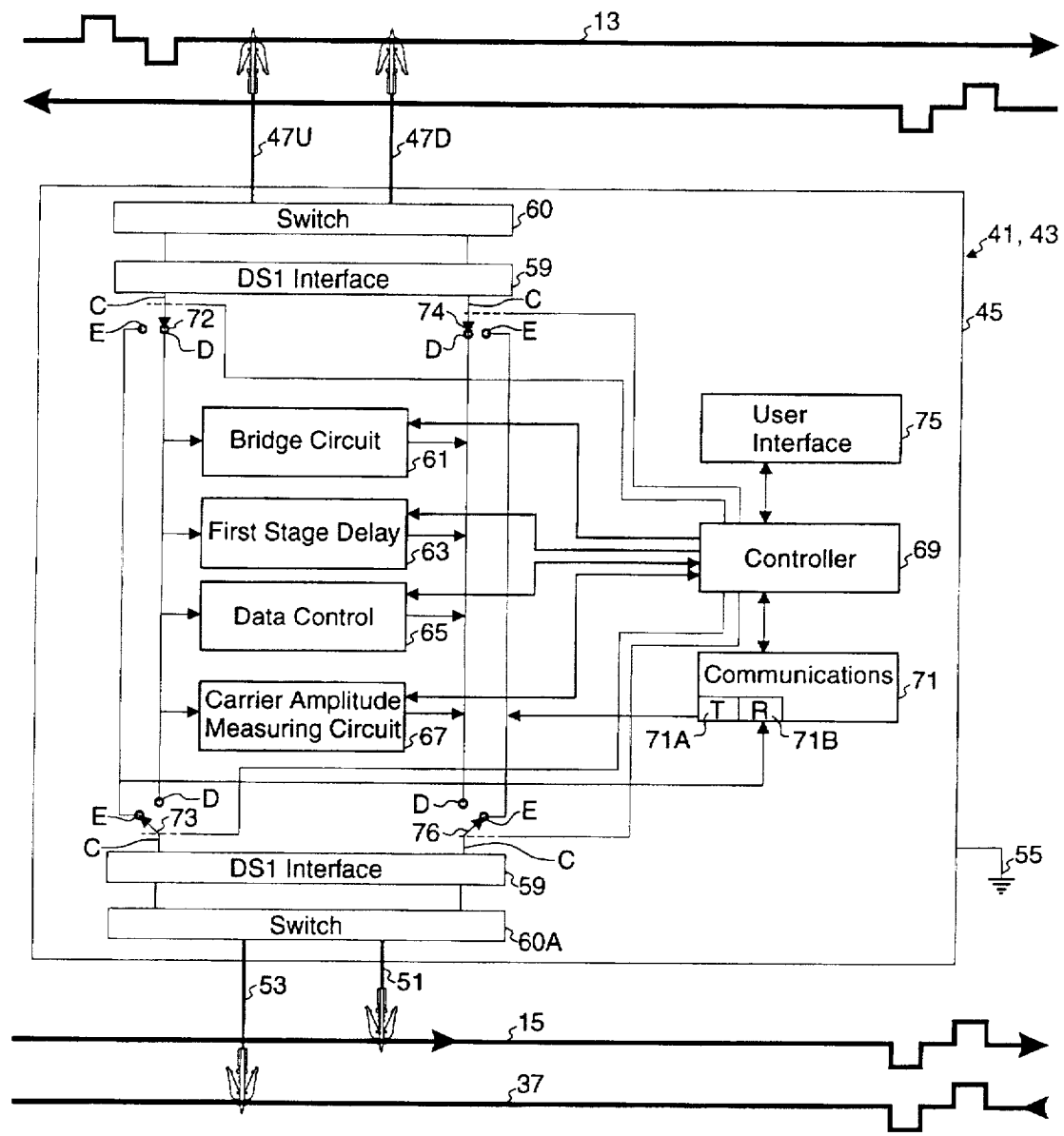
FIG. 2 is a block diagram of one of the units of the present invention.

Referring to FIG. 2, one of the units 41, 43 is shown. Each unit includes a housing 45 and electrical circuits located inside of the housing. The units are mobile so that a field technician can move them from place to place. Each unit has a self-contained power supply (not shown). Referring to FIG. 1, extending from each unit are a first pair of connection leads 47B, a second pair connection leads 47R, a third pair of connection leads 51, a fourth pair of connection leads 53, and a ground wire 55. Each pair of connection leads has a ring connection lead for connection to a ring conductor and a tip connection lead for connection to a tip conductor. Each of the connection leads has a conductive clip 56 on its end to facilitate its connection to the respective conductor. It is prior convention to assign the following nomenclature and coloring to these pairs of connecting leads: The first pair of connection leads is a black cord 47B, the second pair of connection leads is a red cord 47R, and the third pair of connection leads is a white cord 51. In this specification, the fourth pair of connection leads is referred to as green cord 53.

Referring again to FIG. 2, inside of each housing, there is one or more line interfaces 59, a switch 60 for the black and red cords, a switch 60A for the white and green cords, a bridge circuit 61, a first stage delay circuit 63, a data control circuit 65, a carrier amplitude measuring circuit 67, a controller 69, a communications circuit 71, a first switch 72, a second switch 73, a third switch 74, a fourth switch 76, and a user interface 75.

There are line interfaces 59 for the cords 47U, 47D, 51, 53. (In FIG. 2, the black and red cords are shown as an upstream cord 47U and a downstream cord 47D, which will be explained in more detail below.) The line interfaces 59 interface between the digital telephone lines and the electronics of each unit 41, 43.

The switch 60 is connected to the black and red cords 47B, 47R. The switch 60 allows the technician to connect the unit to the old line without knowing in advance the direction of data flow through the line. After a determination of the direction of data flow has been made, the switch 60 is set to provide an upstream cord 47U (one of the black or red cords) and a downstream cord 47D (the other of the black or red cords). The switch 60A is connected to the white and green cords 51, 53 for similar purposes. The switch 60A allows the white cord to transmit data at the upstream unit 41 (see FIG. 1) and to receive data at the downstream unit 43. The switch 60A allows the green cord to receive data at the upstream unit and to transmit data at the downstream unit. Each of the switches 60, 60A function like a crosspoint switch, and may be solid state.

Figure 3:
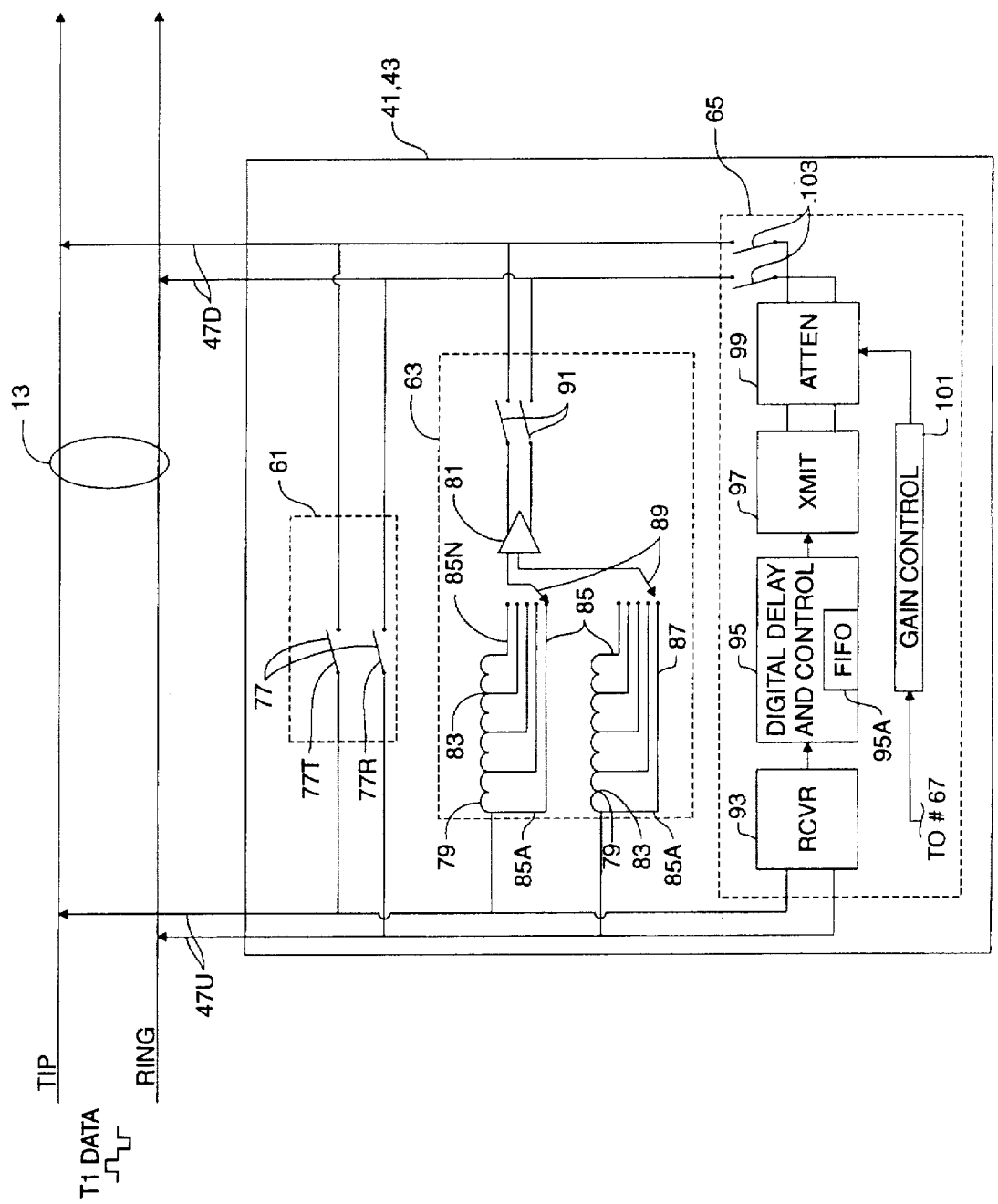
FIG. 3 is a block diagram showing details of the bridge circuit, the first stage delay circuit, and the data control circuit of the unit of FIG. 2.

FIG. 3 shows the bridge circuit 61, the first stage delay circuit 63, and the data control circuit 65 in more detail. The bridge circuit 61 has two parallel single-pole, single-throw switches 77. One switch 77T is connected in series with the tip conductors of the black cord 47B and the red cord 47R. The other switch 77R is connected in series with the ring conductors of the black and red cords. Alternatively, the bridge circuit can contain one double-pole, single-throw switch.

The first stage delay circuit 63 includes analog variable delay lines 79 and an analog buffer 81. The delay lines 79 are conventional and commercially available devices. Each delay line provides an inductive coil 83 having plural taps 85 thereon. The taps 85 are spaced along the length of the coil 83. There is a first tap 85A which is located at the upstream end of the coil 83. This tap provides the least amount of delay. There is also an nth tap 85N that is located at or near the other end of the coil 83. This tap provides the most amount of delay. Each tap is connected to a unique terminal 87, which forms part of switch 89. Each switch 89 can sweep across the plural terminals so as to make contact with the individual taps 85.

The common terminal of each switch 89 is connected to an input of the buffer 81. The buffer 81 provides gain so as to recover any loss in gain due to the delay lines 79. Thus, the overall gain of the first stage delay circuit 63 is one. The outputs of the buffer are each connected to the respective tip and ring conductors of the downstream cord 47D by way of respective switches 91.

The data control circuit 65 has a receiver 93. The receiver 93 has inputs that are connected to the tip and ring conductors of the upstream cord 47U (the connection is through the respective interface 59 and the switch 60). The receiver 93 includes a circuit to convert the bipolar DS1 data to unipolar data. The receiver 93 also includes a clock recovery circuit. The output of the receiver 93 is connected to an input of a digital delay and control circuit 95. The digital delay and control circuit 95 includes a First In First Out (FIFO) memory 95A, and a microprocessor control. The digital delay and control circuit 95 is capable of introducing and eliminating delay in the stream of data bits. In addition, the digital delay and control circuit 95 can manipulate the data by adding or subtracting data bits. The output of the digital delay and control circuit 95 is connected to the input of a transmitter 97. The transmitter 97 includes a circuit that converts the unipolar data to bipolar data. The output of the transmitter 97 is connected to the input of an attenuator 99.

The attenuator 99 has a gain control input, which is connected to a gain control circuit 101. The gain control circuit 101 has an input that is connected to an output of the carrier amplitude measuring circuit 67. The outputs of the attenuator 99 are connected to the respective tip and ring conductors of the downstream cord 47D (the connection is through the respective interface 59 and the switch 60), by way of respective switches 103.

Referring back to FIG. 2, the carrier amplitude measuring circuit 67 is connected to either of the black or red cords and to the controller 69. The circuit 67 measures the carrier amplitude between the ring and tip conductors of the old line 13.

The controller 69 is a conventional and commercially available microprocessor. The controller includes ROM elements, RAM elements, and interface elements. The controller 69 has inputs that are connected to the data control circuit 65, the carrier amplitude measuring circuit 67, the communications circuit 71, and the user interface 75. The controller 69 has outputs that are connected to the switches 60, 60A, the switches 77 (see FIG. 3) of the bridge circuit 61, the switches 89, 91 of the first stage delay circuit 63, the switches 103, the digital delay and control circuit 95, and the gain control circuit 101 of the data control circuit 65, the communications circuit 71, the first, second, third, and fourth switches 72, 73, 74, 76 and the user interface 75. The controller 69 opens and closes all the switches to which it has outputs connected thereto.

The communications circuit 71 provides two way voice and data communications over the telephone lines and includes a standard and commercially available DS1 transmitter 71A and receiver 71B. The communications circuit utilizes one pair of telephone lines for transmitting and another pair for receiving. The communications circuit includes connections for a telephone handset for audio communications.

The first, second, third, and fourth switches 72, 73, 74, and 76 each include two double-pole, double-throw switches. For each switch circuit, one pole is connected to the tip conductor, while the other pole is connected to the ring conductor. All of the switches have their common terminal C connected to the respective DS1 interface 59. The common terminal of the first switch 72 is connected to either the upstream cord 47U or the downstream cord 47D, depending on the setting of the switch 60. Conversely, the common terminal of the third switch 74 is connected to whichever of the upstream or downstream cord that is not connected to the first switch 72. The common terminal of the second switch 73 is connected to either the white cord 51 or the green cord 53, depending on the setting of the switch 60A. Conversely, the common terminal of the fourth switch 76 is connected to whichever of the white or green cord that is not connected to the second switch 73. The first switch 72 has one of its contacts D connected to the input of the circuits 61, 63, 65 and the other of its contacts E connected to the receiver 71B of the communications circuits 71. The second switch 73 has one of its contacts D connected to the input of the circuits 61, 63, 65 and the other of its contacts E connected to the receiver 71B of the communications circuit 71. The third switch 74 has one of its contacts D connected to the output of the circuits 61, 63, 65 and the other of its contacts E connected to the transmitter 71A of the communications circuit 71. The fourth switch 76 has one of its contacts D connected to the output of the circuits 61, 63, 65 and the other of its contacts E connected to transmitter 71A of the communications circuit 71. The switches in the switch circuits can be solid state, digital, or mechanical.

As an alternative design, the bridge circuit 61 can be directly connected between the upstream and downstream cords 47U, 47D. Also, a similar type of bridge circuit can be located directly between the new line and the old line to make the transfer.

The user interface 75 includes a display (such as a liquid crystal display) and a keypad and may include an interface for an external computer.

The operation of the system 11 will now be described. Although the present invention is described in terms of transferring a single pair, the invention can easily transfer two or more pairs together. For example, the invention can transfer both the transmit and receive sides at the same time.

Referring to FIG. 1 again, the locations along the old line 13 are identified by field technicians. The first unit 41 is placed at the upstream location A while the second unit 43 is placed at the downstream location B. The field technician operating the first unit connects the respective ground wire 55 to a good ground. Likewise, the field technician operating the second unit connects the respective ground wire to a good ground.

The initial position of the switches 77, 91, 103 (see FIGS. 2 and 3) inside of each unit is open. The initial position of the switch 89 in the first stage delay circuit 63 is at zero delay. The initial positions of the first and third switches 72, 74 are to connect the upstream and downstream cords 47U, 47D (also referred to as the black and red cords) to the circuits 61, 63, 65 (the switches 72, 74 are closed on contacts D). The initial positions of the second and fourth switches 73, 76 are to connect the communications circuit 71 to the white and green cords 51, 53 (the switches 73, 76 are closed on contacts E).

The red cord 47R of each unit is connected by the respective field technician to the old line 13 such that the red cord ring connection lead is connected to the ring conductor of the old line and such that the red cord tip connection lead is connected to the tip conductor of the old line.

The black cord 47B of each unit is also connected to the old line, but at a location that is determined by the respective red pair 47R and the other unit. The respective black cord is connected to the old line on the side of the respective red cord that is furthest away from the other unit, as shown in FIG. 1. Thus, for the first unit 41, the red cord 47R is located closer to the second unit 43 than is the black cord 47B. For the second unit 43, the red cord 47R is located closer to the first unit 41 than is the black cord 47B. The black cord ring connection lead is connected to the ring conductor of the old line and the black cord tip connection lead is connected to the tip old line conductor.

The white cord 51 of each unit is connected to the new line 15 such that the white cord ring connection lead is connected to the ring conductor of the new line and the white cord tip connection lead is connected to the tip conductor of the new line.

The green cord 53 is connected to the companion circuit 37 of the new line. For example, in FIG. 1, the new line transmits data from left to right. The companion circuit transmits data from right to left. The green cord ring connection lead is connected to the ring conductor of the companion line, and the green cord tip connection lead is connected to the tip conductor of the companion line.

Figure 4:
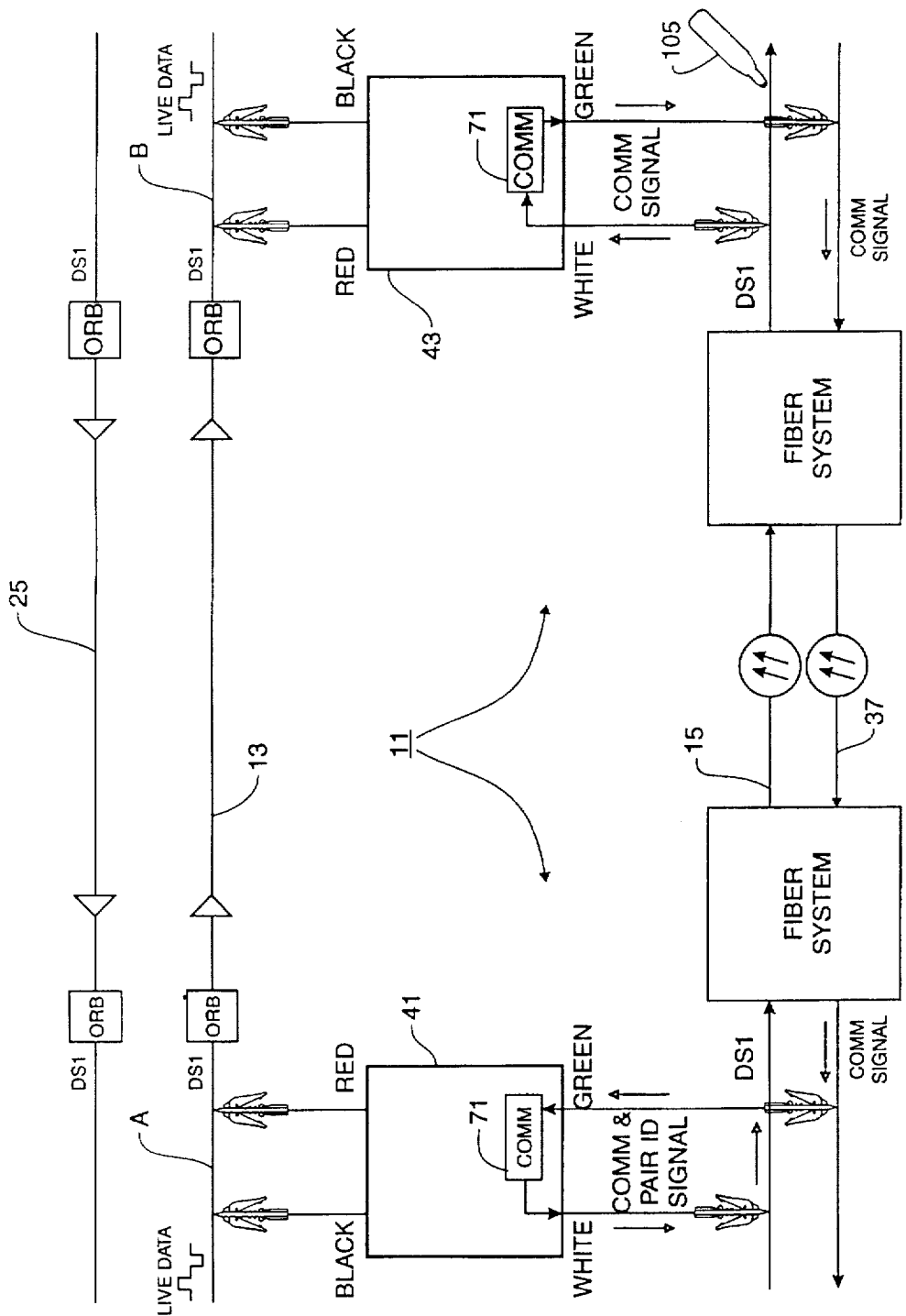
FIG. 4 is a block diagram of the system shown in identifying the new line and establishing communications.

Typically, one unit is connected to the new line 15 first. As a practical matter, it can be difficult to connect both units to the same new line. This is because it is difficult to identify the new line at the other location. Identifying the new line at the other location is simplified by using the one unit that is connected to the new line to transmit a unique sounding DS1 signal on the new line (such as a warbling tone). The communications circuit 71 generates this signal. Because the unique sounding signal is a DS1 signal, it is able to pass through any repeaters on the new line. As shown in FIG. 4, a digital signal identifier 105, such as is described in U.S. Pat. No. 5,140,614, can be used at the other end of the new line 15 to locate the correct pair. The disclosure of U.S. Pat. No. 5,140,614 is incorporated herein by reference.

Once the new line is identified and the units are connected thereto, voice and data communications are set up over the new line 15 and its companion line 37. The communications circuit 71 in each unit is utilized. Referring to FIG. 4, communications goes from one unit to the other unit through the white cords 51, while communications in the opposite direction is though the green cords 53.

When both units are connected, various conventional tests are performed to insure that the first and second units are connected to the same old line, polarity is correct, and that the connections made by the black, red, white, and green cords are electrically satisfactory. The controller provides readiness information to the technician by way of the user interface 75. The two units 41, 43 communicate with each other throughout the transfer operation using the respective communications circuits 71 and the lines 15, 37. (Immediately after the transfer, communications occurs using the lines 13, 37.)

The system 11 determines the direction of data flow through the old line 13. One way to determine the direction of data flow is to use the carrier amplitude measuring circuit 67 in each unit 41, 43. Another way to determine the direction of data flow is to measure the voltage and current flow through a small resistance that is in series with both wires. Also, a directional coupler can be used. Still another way is to utilize a magnetic coupling around one of the wires, wherein the direction of data can be determined.

The determination of the upstream location is used to set the switches 60, 60A in each unit. The switch 60 is set so that the upstream cord is connected to the receiver 93 of the data control circuit 65. Thus, for the first unit 41 located at the upstream location A, the black cord is the upstream cord. The red cord is the upstream cord for the second unit 43 located at the downstream location B. The switch 60A is set so that the white cord 51 of each unit is connected to the new line 15 and the green cord 53 of each unit is connected to the companion line 37.

Figure 5:
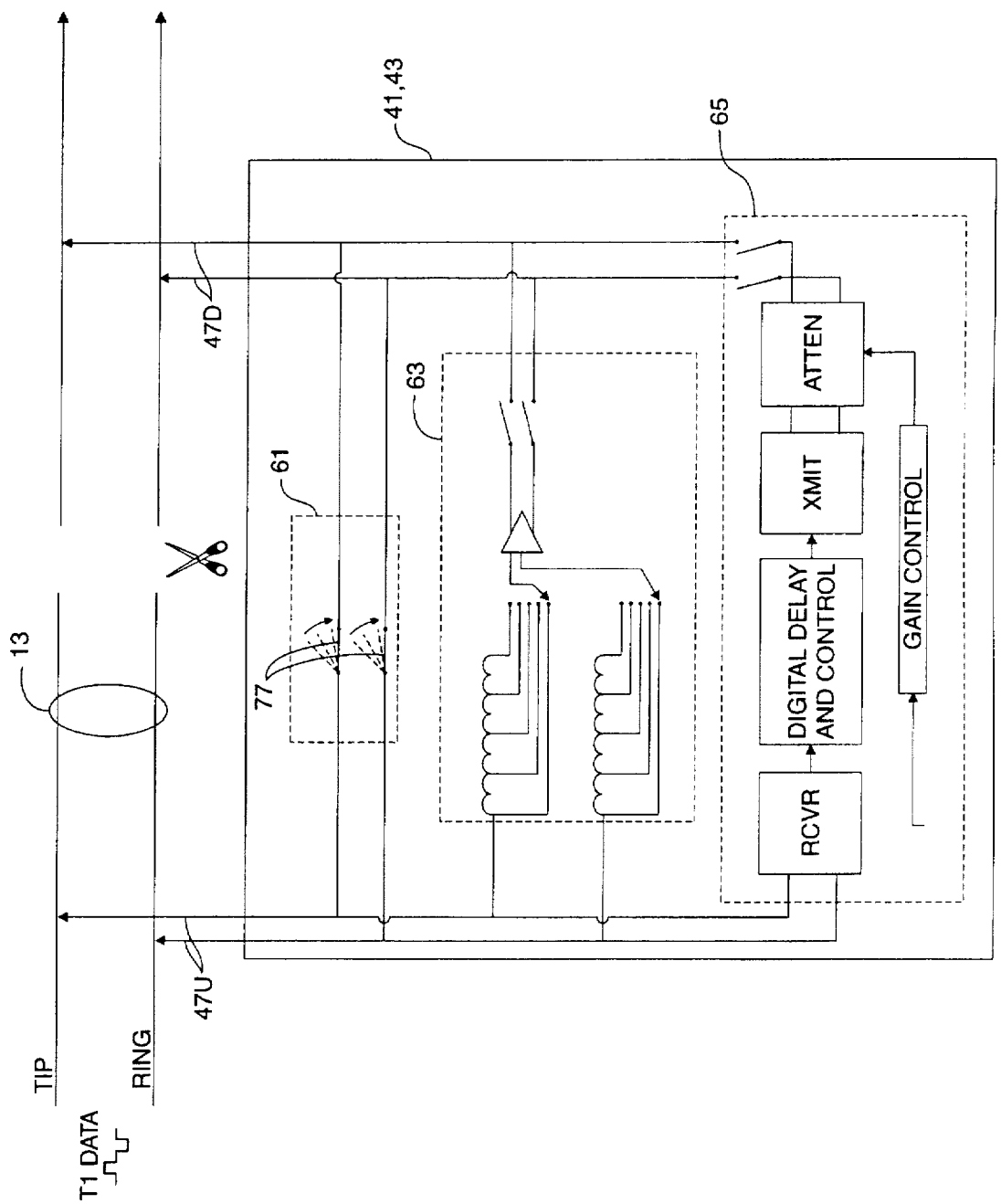
FIG. 5 is a block diagram of one of the units, showing the old line cut.

Referring to FIG. 5, preparation is made for cutting the old line 13. (FIGS. 3, 5–7, and 9 show a block diagram that represents each unit 41, 43 as it is connected to the old line by its black and red cords, which cords are shown as upstream and downstream cords 47U, 47D.) The controller 69 (see FIG. 2) in each unit closes the switches 77 in the respective bridge circuit 61. The bridge circuit 61 introduces no delay into the data. The controller 69 signals the technician through the user interface 75 that the old line can be cut. The technician at each end cuts the old line 13 between the black and red cords. The data flowing on the old line is rerouted around the cut through the upstream cord 47U, the bridge circuit 61, and the downstream cord 47D. The technician notifies the controller 69 through the user interface 75 that the cord has been cut by the user interface.

Next, a control element is inserted in series with the data. Specifically, the data control circuit 65 is inserted in series with the data. However, the data control circuit 65 introduces some delay into the data. Therefore, the data is passed through the first stage delay circuit 63, wherein some delay is introduced into the data before passing the data through the data control circuit 65.

Figure 6:
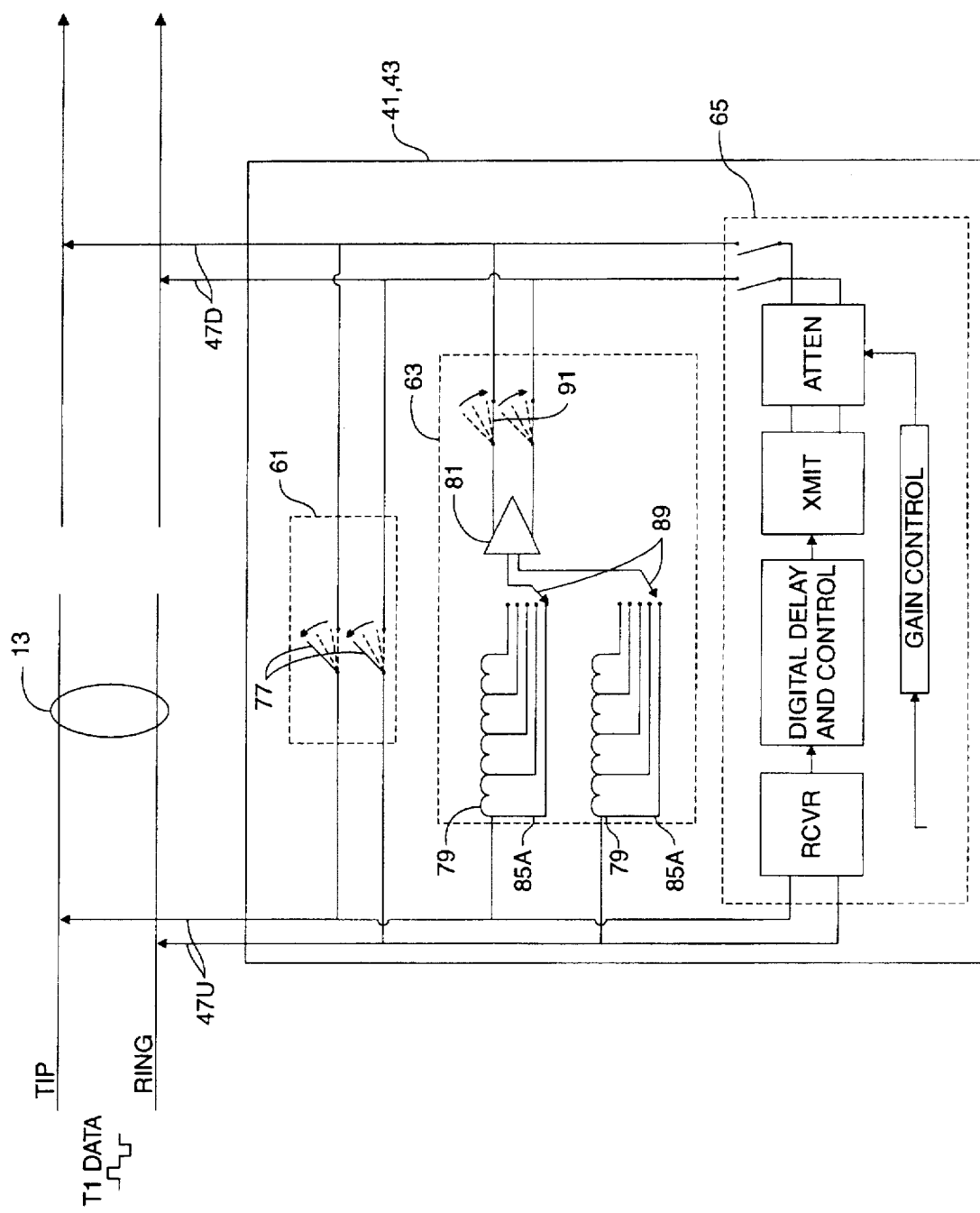
FIG. 6 is a block diagram of one of the units, showing the insertion of the first stage delay circuit in series with the data.
Figure 7:
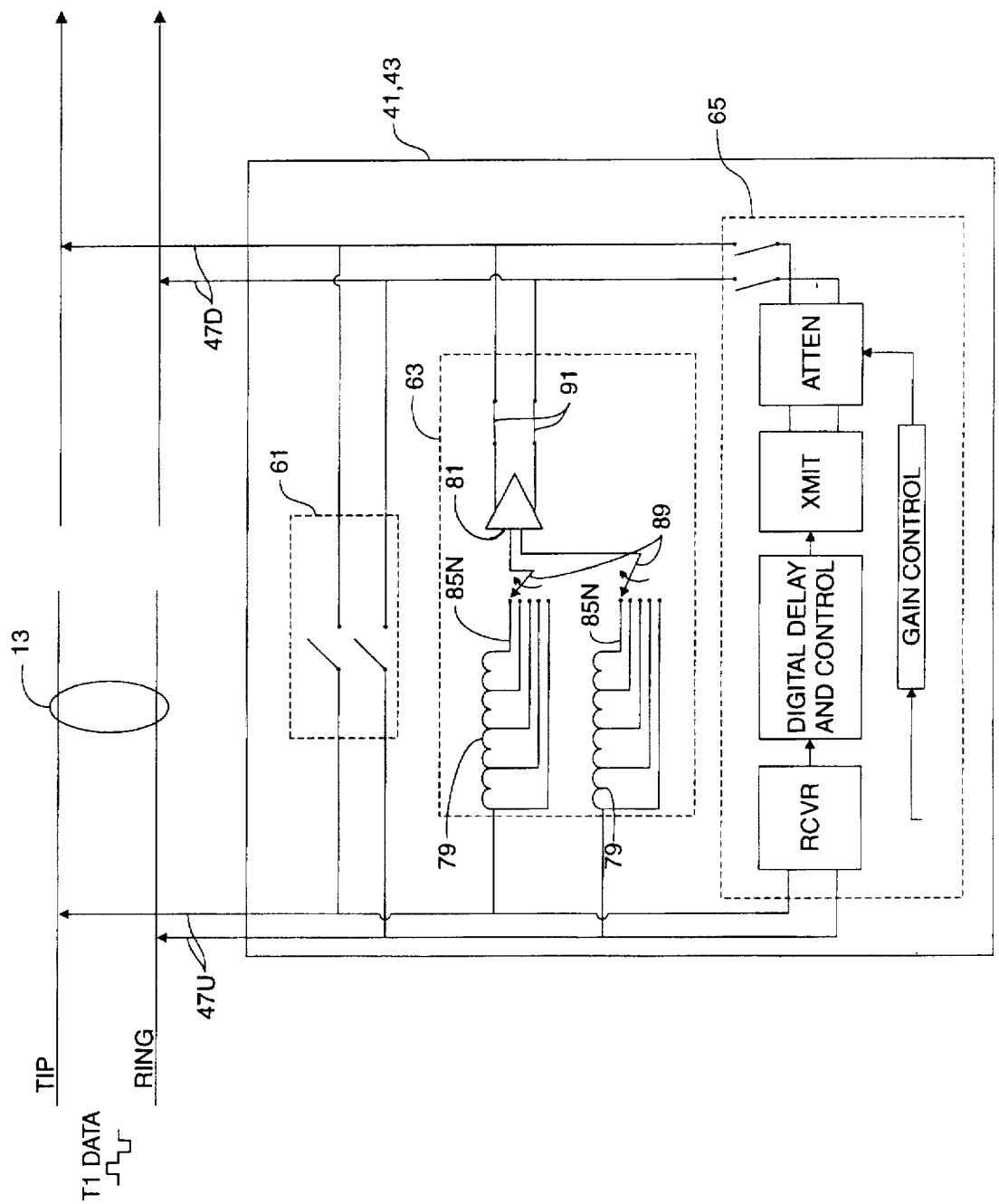
FIG. 7 is a block diagram of one of the units, showing the insertion of incremental delay into the data.

Referring to FIG. 6, in each unit, the controller 69 (FIG. 2) opens the switches 77 in the bridge circuit 61 at the same time that the switches 91 in the first stage delay circuit 63 are closed. Switches 77 and 91 are fast switches so as to switch between bits.

When the first stage delay circuit 63 is first connected in series with the data, the delay is set to zero (that is, the switches 89 contact the first tap 85A). Therefore, because the delay and gain through both circuits 61, 63 is the same, there is no impact to the operation of the DS1 circuit. In each of the units 41, 43, the delay is gradually increased by moving the switches 89 from one tap to another towards the nth tap 85N (see FIG. 7). (One unit makes its adjustments first, communicates this to the other unit, which other unit then makes its adjustments.) The rate of increase is so as to fall within the specifications of the DS1 circuit. The repeaters 21, 23 and receiver 19 are all built to DS1 specifications. Therefore, by making adjustments to the time of arrival of bits at the repeaters or the receiver that fall within the specifications for the circuit, the equipment will not be affected. In other words, the data reception by the receiver 19 or by the repeaters is not disturbed by the incremental adjustments of delay to the data.

The delay is increased to match the delay that is produced by the data control circuit 65. The delay produced by the data control circuit 65 can be measured at the factory or it can be measured upon power up and initialization of the unit.

Figure 8:
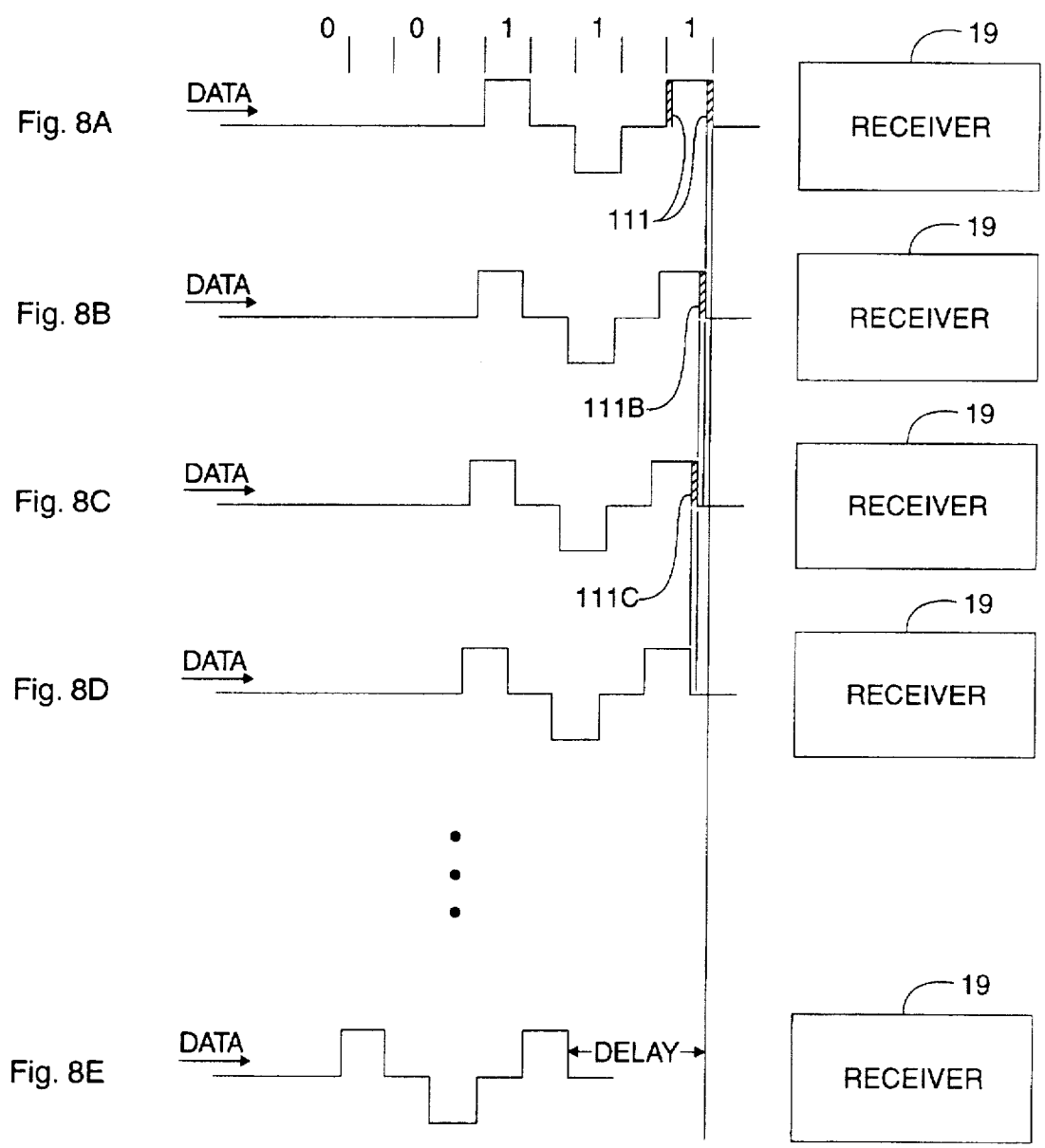
FIGS. 8A, 8B, 8C, 8D and 8E are schematic diagrams of a data stream, showing how data is delayed with the present invention.

To illustrate how to compensate for delay on the bit level, reference is made to FIG. 8A, where there is shown data arriving on the old line at the receiver 19. The data is DS1 data and is therefore pulse code modulated using a conventional technique known as Alternate Mark Inversion (AMI). "1's" are represented by a pulse, while "0's" are not. The "1's" bits alternate polarity to eliminate any dc bias. The pulses have a 50 percent duty cycle. Thus, the receiver 19 receives the following sequence of numbers: 11100 (because the data is moving from left to right, the receiver receives the right most bit first).

The receiver is synchronized with the incoming pulse train. The receiver receives data during a window or interval of time. If a pulse is present during the window of time, then the bit is a 1. If a pulse is absent during the window of time, then the bit is a 0.

The window of time is preceded and succeeded by "don't care" intervals, wherein the receiver is not receptive. These don't care intervals 111 are shown in FIG. 8A. Assume for purposes of this example that each don't care interval 111 is one-eighth of the pulse width (from leading to trailing edges). Also, assume that delay is to be added to the data, wherein the leading edge don't care interval will be utilized. FIG. 8B shows a second set of data (with the same numbers as in FIG. 8A for simplicity) that is sent over the telephone line subsequent to the data in FIG. 8A. The bits have been delayed by one-eighth of a pulse relative to the bits of FIG. 8A. This incremental delay falls within the don't care interval 111. Thus, when the window of time with the receiver 19 occurs in FIG. 8B, the bit occurs within the window of time and the receiver receives the bit. FIG. 8C shows a third set of data sent subsequent to the set of FIG. 8B. The bits have been delayed by one-eighth of a pulse relative to the bits of FIG. 8B. This incremental delay falls within the don't care interval 111B of the bits of FIG. 8B. FIG. 8D shows a third set of data sent subsequent to the set of FIG. 8C. The bits have been delayed by one-eighth of a pulse relative to the bits of FIG. 8C. This incremental delay falls within the don't care interval 111C of the bits of FIG. 8C. Thus, the data is delayed in such a manner so as not to interrupt the operation of the receiver. As the data is delayed, the repeaters and the receiver adjust so as to stay synchronous to the data. The cumulative effect of the individual adjustments to the delay can be far greater than the width of a pulse, as shown by FIG. 8E.

Figure 9:
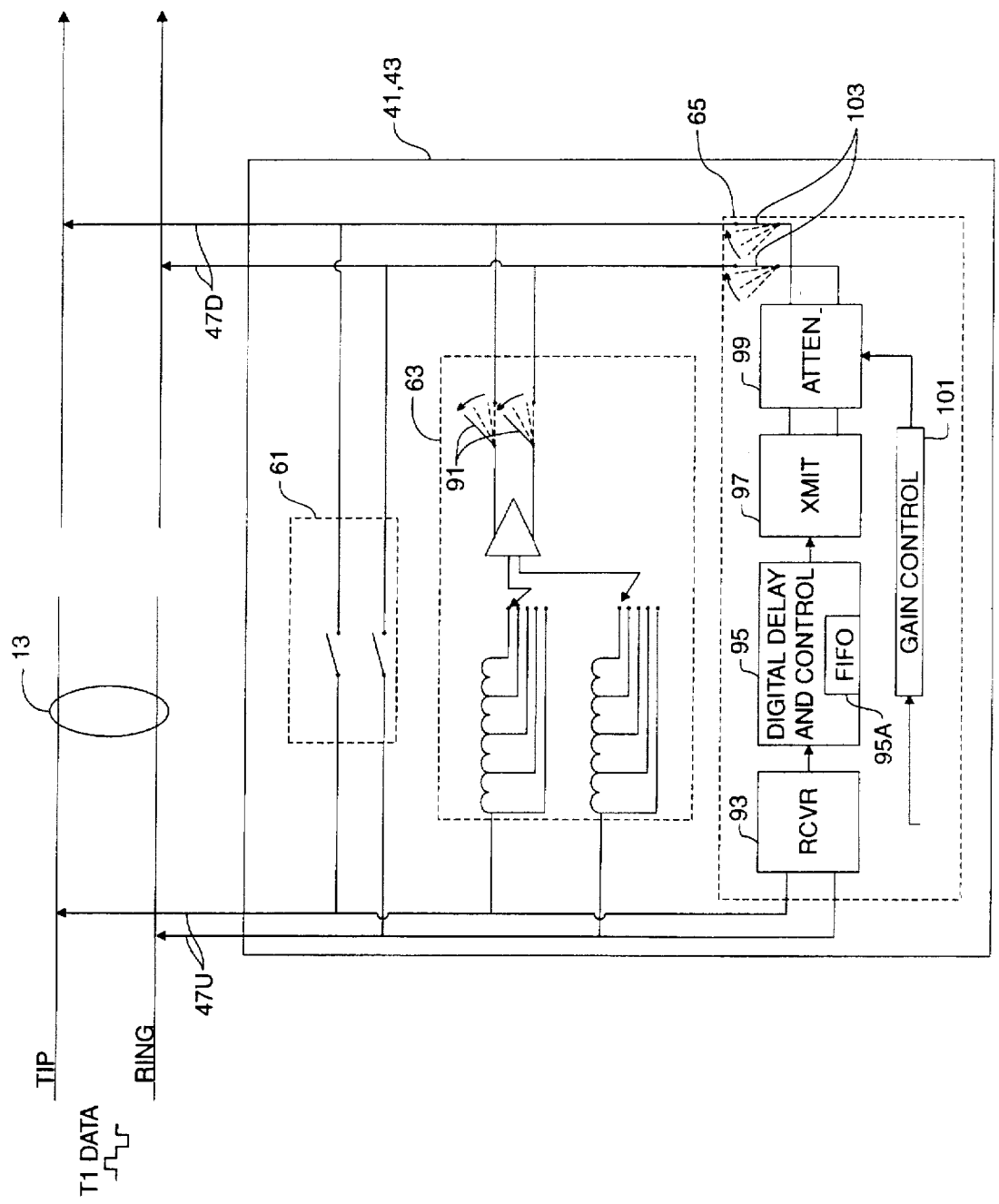
FIG. 9 is a block diagram of one of the units, showing the insertion of a control element in series with the data.

When the data passing through the first stage delay circuit 63 has been delayed by the proper amount, the data is then passed through data control circuit 65. Referring to FIG. 9, this is accomplished in each unit 41, 43 by the controller simultaneously opening the switches 91 in the first stage delay circuit 63 and closing the switches 103 in the data control circuit 65. Switches 91 and 103 are fast switches so as to switch between bits. The overall gain of the data control circuit 65 is initially set to one. This is accomplished with the gain control circuit 101 and the attenuator 99. Because the delay and gain through both circuits 63, 65 is the same, there is no impact to the operation of the DS1 circuit. The data now passes through the data control circuit 65.

The data control circuit 65 manipulates the data being sent along the old line. For example, the bit rate and phase of the data on the old line can be varied at the upstream unit 41. The data enters the data control circuit 65 in the upstream unit 41. The FIFO memory 95A in the data control circuit stores the data for some amount of time. As the data exits the FIFO memory, it exits at a rate that is relative to bits that both precede and succeed the data. This relative rate, and also the phase, of the data is varied by controlling the timing of the exit of the data from the FIFO memory.

These variations in bit rate and phase are detected at the downstream unit 43, wherein confirmation is made of the two units being connected to the same old line. The data enters the downstream FIFO memory in the downstream data control circuit 65. The downstream FIFO memory acts in a manner analogous to a shock absorber that minimizes variations. The FIFO memory, which has a large storage capacity, also minimizes variations. The data enters the FIFO memory at various rates, exits the FIFO memory at a constant bit rate and phase. The FIFO memory thus smooths out variations so that the receiver 19 receives an uninterrupted data stream.

Also, the data control circuit 65 incrementally adjusts the delay of the data in the old line so as to match the delay of the data in the new line. This can be done several ways. For example, the relative difference between the transport lags of the old and new lines can be measured. The relative difference in transport lags is measured using a password, which is a known group of bits.

In the preferred embodiment, the delay on the old line is increased so as to be greater than the delay on the new line. Thus, the information arrives on the new line at the downstream location before it arrives on the old line at the downstream location.

As the data enters the FIFO memory of the upstream data control circuit 65, a data word is removed and replaced with the password. The password is then sent on the old line 13 to the downstream unit.

The data word that was removed from the data is sent to the downstream unit along the new line 15. The communications circuit 71 in the upstream unit 41 transmits the data word. The communications circuit 71 in the downstream unit 43 receives the data word and passes it the data control circuit. The time of receipt of the data word is noted by the downstream unit. The data word is waiting in the downstream data control circuit when the password arrives on the old line.

As the password arrives at the downstream unit, it is temporarily stored in the FIFO memory, along with the rest of the data received from the old line. The password is identified by comparing it to a password stored in the memory of the controller. The data control circuit 65 performs this comparison. After the password is identified, the time of receipt by the downstream unit is noted, and the password is removed. The password is removed by removing it from the FIFO memory and replacing it with the data word that was sent over the new line. The data word then exits the FIFO memory, wherein it is then transmitted to the receiver 19. Thus, the data that is received by the receiver 19 is the same data that was transmitted by the transmitter 17.

The downstream unit determines the relative difference in delays between the old and new lines by determining the difference between the times of receipt of the data word and the password. Once the relative difference is known, the delays and phases on the old and new lines are then matched. When matching the delay and phase of the old line to that of the new line, either unit can be used to make the adjustment. Likewise, the phases of the data on the old and new lines are matched. This ensures that the receiver 19 will continue to receive the data in phase after the transfer.

As an alternative to the use of passwords in determining the amount of delay to provide to the data in the old line, correlation can be used. At the upstream unit, the data is routed to both the old and the new lines 13, 15. At the downstream unit, both streams of data are compared using correlation techniques. As the delay of the data is adjusted by the upstream unit, the downstream unit measures if the two data streams are matched using correlation techniques. The downstream unit communicates with the upstream unit as to whether more or less delay is needed on the new line. The upstream unit uses this information to adjust the delay.

Likewise, if a match of amplitude is needed, then the data control circuit incrementally adjusts the amplitude of the data in the old line so as to match the amplitude of data in the new line. The amplitude at the downstream end is measured and adjusted by the downstream data control circuit 65. Specifically, the gain control circuit 101 adjusts the amplitude. The upstream unit could be used to make the amplitude adjustment.

When the delay and amplitude of the data in the old line 13 matches the delay and the amplitude of the data in the new line 15, the units are ready to make the transfer. The downstream unit communicates to the upstream unit that the data on both lines matches. If the data is not being sent on the new line, the upstream unit 41 does so, wherein the downstream unit 43 receives the data on both the old and the new lines.

Figure 10:
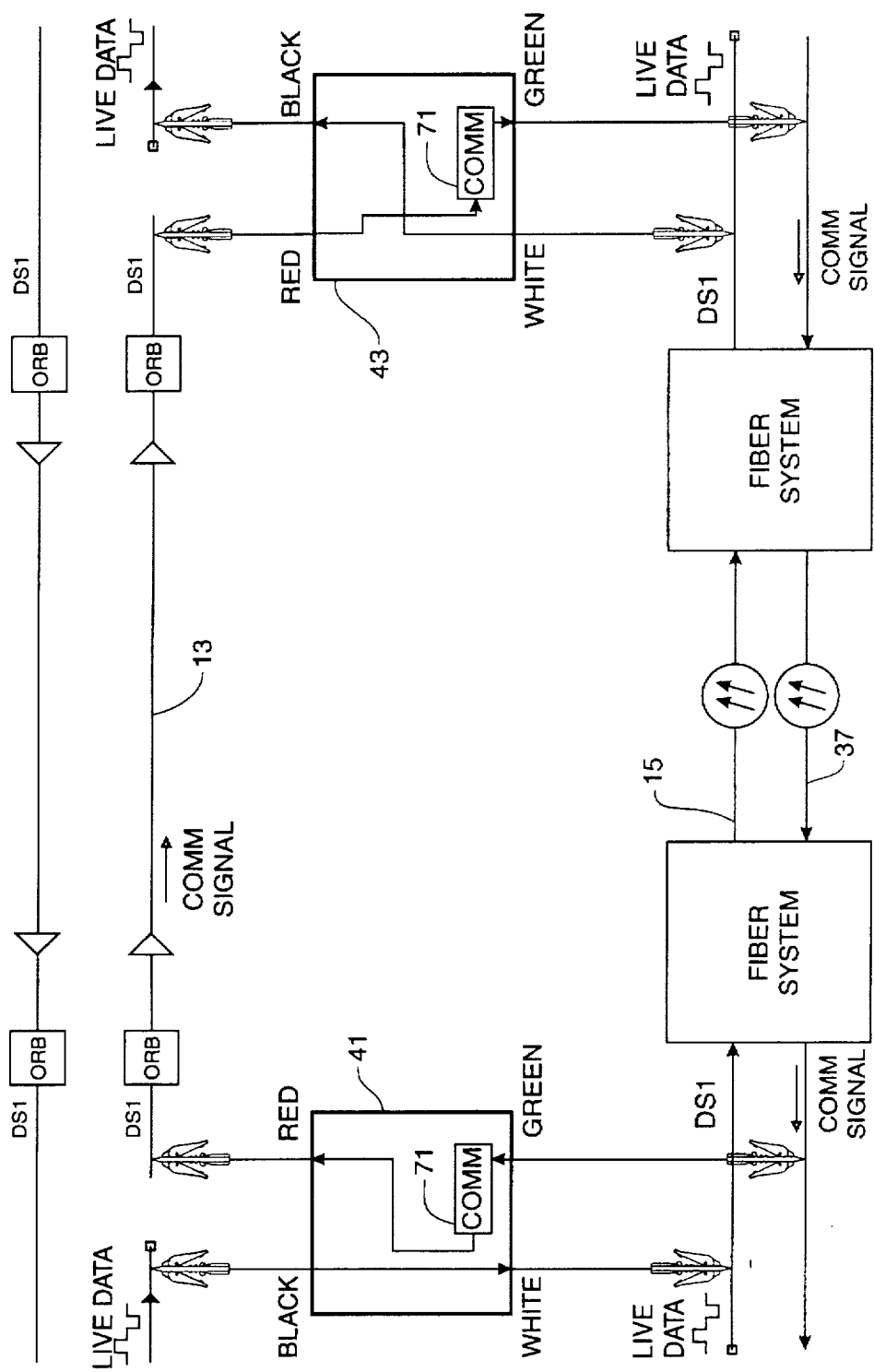
FIG. 10 is a block diagram of the system shown in transferring the data from the old line to the new line.

Just before it transfers the circuit, the downstream unit 43 so notifies the upstream unit 41 over the line 37. The downstream unit 43 then transfers the circuit from the old line 13 to the new line 15. This is done by the controller 69 (FIG. 2) operating the second switch 73 to close the contact E of the input of the data control circuit 65. At the same time, the controller operates the first switch 72 to close the contact E of the receiver 71B of the communications circuit 71. This switching makes a connection between the new line and that portion of the old line that is downstream of the downstream unit. Also, the communications circuit 71 is readied for operation using the old line. After some period of time has passed, the upstream unit also makes the transfer from the old line 13 to the new line 15 by its controller operating the third switch 74 so as to close with the contact E that is connected to the transmitter 71A of the communications circuit 71. At the same time, the controller operates the fourth switch 76 so as to close with the contact D that is connected to the output of the data control circuit 65. These switch operations at the upstream unit transfer the data from the old line to the new line and reestablish communications with the downstream unit over the old line. Thus, not only is the DS1 circuit transferred from the old line to the new line, but the two units 41, 43 can continue to communicate using the old line 13 and the companion line 37 (see FIG. 10).

Switching can be performed between bits in the data stream. This insures that no data is lost. This is true as well for switching the data stream at other steps in the operation of the invention. The DS1 signal has a 50 percent duty cycle. The switching is thus preferably done during the 50 percent of the time when there is no bit. When a bit goes by, then the switching can be achieved. The present invention also has the capability of switching on a bit rather than between bits. By being able to switch between bits, the need for utilizing fast switches for switches 72, 73, 74, 76 is eliminated.

After the transfer, the control element is removed from the path of the data stream. Specifically, the digital control circuit 65 in each unit is taken out of the data stream. However, any delays in the data stream are first removed. Referring to FIG. 9, all of the delay provided by the data control circuit 65 in each unit is incrementally eliminated. After all of the programmed delay is taken out of each data control circuit, the data is routed from the digital control circuit 65 to the first stage delay circuit 63 for each unit. The routing is accomplished by opening the switches 103 and closing the switches 91 in both units.

Once the data passes through the first stage delay circuit 63, any delay that has been previously inserted is now incrementally removed so as to not disrupt the operation of the receiver 19. Thus, the switches 89 are moved, tap by tap, to the zero delay tap 85A. This is done for each unit.

Figure 11:
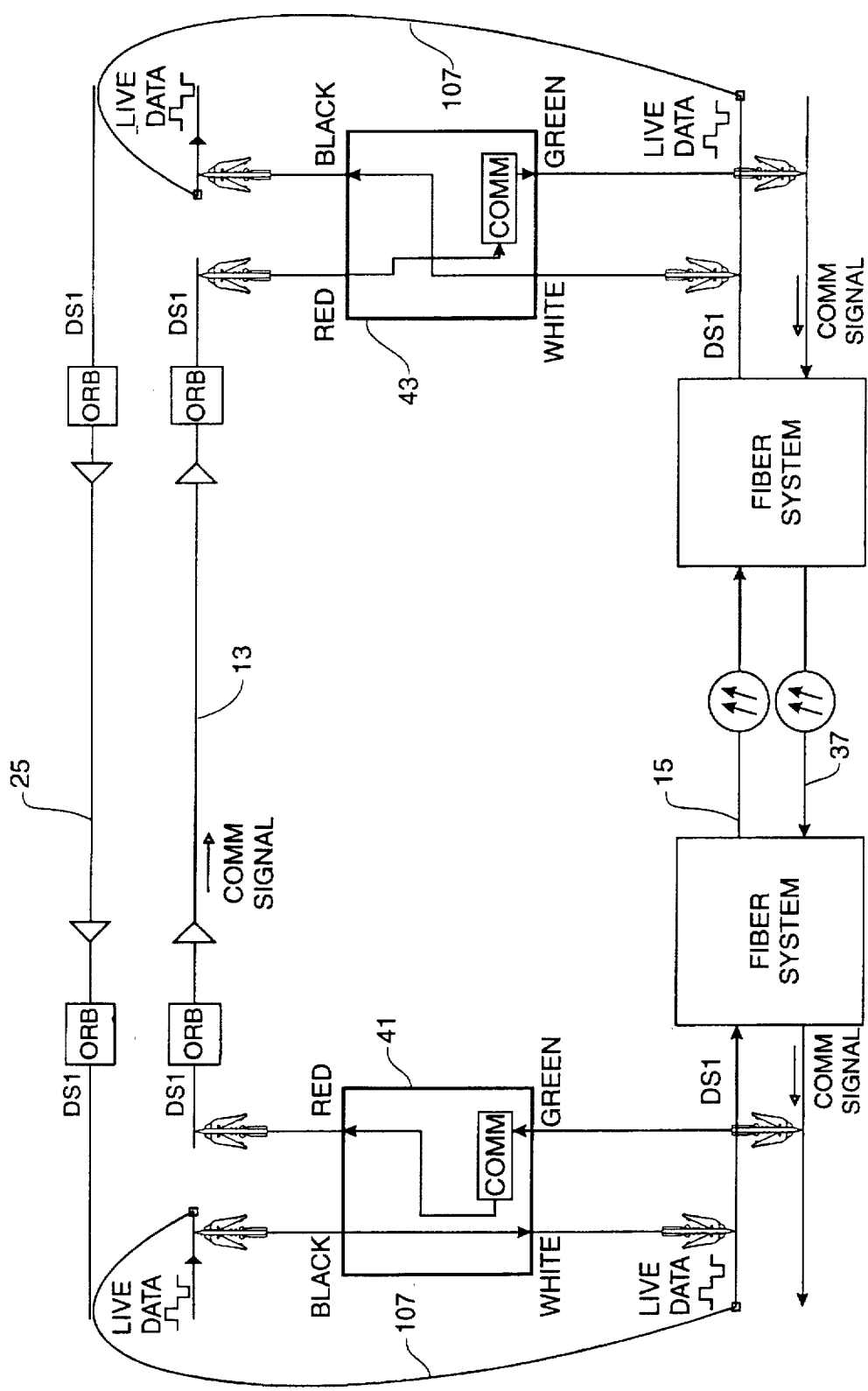
FIG. 11 is a block diagram of the system shown with splicing to complete the transfer.

After all of the delays have been removed, the data is passed though the bridge circuit 61 in each unit. Thus, switches 91 are opened and switches 77 are closed. The old line is now spliced 107 to the new line (FIG. 11), in accordance with conventional techniques. The cords can then be removed from the old line and reconnected to the other side of the old DS1 span to complete the other half of the transfer.

Although the present invention has been described in terms of DS1 circuits, it can also be used with other versions of pulse code modulation, such as E1, T1C and DS2.

The foregoing disclosure and the showings made in the drawings are merely illustrative of the principles of this invention and are not to be interpreted in a limiting sense.

We claim:

1. A method of transferring a digital telephone circuit from a first communications channel between a transmitter and a receiver and a second communications channel between the transmitter and the receiver, the first communications channel carrying pulse code modulated information with a first propagation delay, the second communications channel being structured and arranged to carry pulse code modulated information with a second propagation delay, the pulse code modulated information on the first communications channel having pulses that occur within specified intervals of time, comprising the steps of:

a) incrementally adjusting the first propagation delay such that for each incremental adjustment, the pulses continue to occur within the specified intervals of time;

b) continuing the incremental adjustment of the fist propagation delay until the first propagation delay matches the second propagation delay;

c) after the first propagation delay has been matched to the second propagation delay, transferring the circuit from the first communications channel to the second communications channel.

2. The method of claim 1, wherein the transmitter provides first information on the first communications channel, further comprising the steps of:

a) at an upstream location on the first communications channel, manipulating the first information on the first communications channel so as to introduce variations into the first information;

b) at a downstream location on the first communications channel, detecting the variations in the first information so as to verify the presence of the first communications channel at the downstream location.

3. The method of claim 2, further comprising the step of removing the variations in the first information at the downstream location.

4. The method of claim 1, wherein the first communications channel has an upstream location and a downstream location at which locations the transfer to the second communications channel will occur, further comprising the step of communicating between the upstream and downstream locations over the second communications channel before the step of transferring the circuit occurs.

5. The method of claim 4 further comprising the step of communicating between the upstream and downstream locations over the first communications channel after the step of transferring the circuit occurs.

6. A system for transferring a digital telephone circuit from a first communications channel between a transmitter and a receiver to a second communications channel between the transmitter and the receiver, the first communications channel carrying pulse code modulated information with a first propagational delay, the second communications channel carrying pulse code modulated information with a second propagation delay, the pulse code modulated information on the first communications channel having pulses that occur within specified intervals of time, comprising:

a) an incrementally adjustable delay unit connected in series with the first communications channel, b) a controller connected to the delay unit, the controller adjusting the delay unit so as to produce incremental adjustments of the first propagation delay such that for each incremental adjustment, the pulses continue to occur within the specified intervals of time;

c) means for determining when the first propagation delay matches the second propagation delay;

d) a switch connected between the first communications channel and the second communications channel, the switch being operable by the controller which closes the switch when the first propagation delay matches the second propagation delay.

7. The method of claim 2 wherein the step of manipulating the first information on the first communications channel so as to introduce variations into the first information further comprises the step of adding pulses to the first information channel.

8. The method of claim 1 wherein the transfer between the first and second communications channel occurs between an upstream and a downstream end, with the information propagating from the upstream end to the downstream end, wherein the step of incrementally adjusting the first propagation delay further comprises the step of incrementally delaying the information at the upstream end.

9. The method of claim 8 wherein the step of incrementally delaying the information at the upstream end further comprises the step of receiving the information into a storage device at a first speed and removing the information from the storage device at a second speed for transmission to the downstream end.

10. The method of claim 1 further comprising the step of:
a) measuring the difference between the first and second propagation delays,
b) the step of continuing the incremental adjustment of the first propagation delay until the first propagation delay matches the second propagation delay further comprises the step of changing the first propagation delay by the measured difference.

11. The method of claim 10 wherein the transfer between tho first and second communications channels occurs between an upstream end and a downstream end, with the information propagating from the upstream end to the downstream end, wherein the step of measuring the difference between the first and second propagation delays further comprises the step of:
a) sending identifiable information along the first and second communications channels from the upstream end to the downstream end;
b) determining the time of arrival of the identifiable information at the downstream end on the first communications channel and determining the tine of arrival of the identifiable information at the downstream end on the second communications channel;
c) determining the difference in the two times of arrival.

12. The method of claim 1 wherein the transfer between the first and second communications channels occurs between an upstream end and a downstream end, with the information propagating from the upstream end to the downstream end, wherein the step of continuing the incremental adjustment of the first propagation delay until the first propagation delay matches the second propagation delay further comprises the steps of:
a) sending the information along the first communications channel and also along the second communications channel from the upstream end to the downstream end;
b) at the downstream end, comparing the information sent along the first communications channel to the information sent along the second communications channel to determine if the information sent along the first communications channel arrives at the downstream end at the same time that the information sent along the second communications channel arrives at the downstream end.

13. The method of claim 1 wherein the pulses of the information are separated from each other by interludes; the step of transferring the circuit from the first communications channel to the second communications channel occurring within one of the interludes.

14. The method of claim 1 wherein the transfer between the first and second communications channels occurs between an upstream end and downstream end, with the information propagating from the upstream end to the downstream end, wherein the step of transferring the circuit from the first communications channel to the second communications channel occurs first at the downstream end.

15. The method of claim 1 wherein the transfer between the first and second communications channels occurs between an upstream end and a downstream end, with the information propagating from the upstream end to the downstream end, wherein the pulses of the information on the first communications channel arrive at the downstream end with a first amplitude and the pulses of the information on the second communications channel arrive at the downstream end with a second amplitude, further comprising the step of incrementally adjusting the first amplitude of the pulses until the first amplitude matches the second amplitude.

16. The method of claim 1 wherein the transfer between the first and second communications channels occurs between an upstream end and a downstream end, with the information propagating from the upstream end to the downstream end, wherein the pulses of the information on the first communications channel arrive at the downstream end with a first phase and the pulses of the information on the second communications channel arrive at the downstream end with a second phase, further comprising the step of incrementally adjusting the first phase of the pulses until the first phase matches the second phase.

17. The method of claim 1 wherein the transfer between the first and second communications channels occurs between an upstream end and a downstream end, with the information propagating from the upstream end to the downstream end, further comprising the step of, before incrementally adjusting the first propagation delay, identifying the second communications channel by sending on the second communications channel, at the upstream end, an identifiable pulse code modulated signal, and at the downstream end locating the second communications channel by receiving the pulse code modulated signal.

18. The method of claim 1 wherein at least one of the first and second communications channels comprises an electrical conductor.

19. The method of claim 1 wherein at least one of the first and second communications channels comprises an optical fiber.

20. The method of claim 1, wherein:
a) the transfer between the first and second communications channels occurs between an upstream end and a downstream end, with the information propagating from the upstream end to the downstream end;
b) before incrementally adjusting the first propagation delay, identifying the second communications channel by sending on the second communications channel, at the upstream end, an identifiable pulse code modulated signal, and at the downstream end locating the second communications channel by receiving the pulse code modulated signal;
c) communicating between the upstream end and the downstream end over the second communications channel before the step of transferring the circuit occurs;
d) the step of incrementally adjusting the first propagation delay further comprises the step of incrementally delaying the information at the upstream end;
e) the step of transferring the circuit from the first communications channel to the second communications channel occur first at the downstream end; and
f) the step of transferring the circuit from the first communications channel to the second communications channel occurs within an interlude between the pulses of the information.

21. A method of working on a digital telephone circuit comprising a communications channel between a transmitter and a receiver, the communications channel carrying information represented by pulses, the receiver receiving the pulses within a range of parameters, comprising the steps of:

a) providing a control apparatus that is structured and arranged to produce variations in the information;

b) inserting the control apparatus in series with the information on the communications channel, without exceeding the range of parameters, wherein the reception of pulses by the receiver is uninterrupted;

c) using the control apparatus to incrementally introduce a variation into the information while maintaining the pulses within the range of parameters as received by the receiver.

22. The method of claim 21 wherein said step of incrementally introducing a variation into the information further comprises the step of incrementally introducing a variation in an amplitude of the pulses.

23. The method of claim 21 wherein said step of incrementally introducing a variation into the information further comprises the step of incrementally introducing a variation in a phase of the pulses.

24. The method of claim 21 wherein said step of incrementally introducing a variation into the information further comprises the step of incrementally introducing a variation in a delay of the pulses arriving at the receiver.

25. The method of claim 21 wherein said step of incrementally introducing a variation into the information further comprises the step of incrementally changing the number of pulses in the information.

26. The method of claim 21 wherein the communications channel comprises an upstream location and a downstream location, the upstream and downstream locations being located between the transmitter and the receiver, with the information propagating from the upstream location to the downstream location, further comprising the steps of:

a) said step of incrementally introducing a variation into the information further comprises the step of incrementally introducing a variation into the information at the upstream location;

b) detecting the variation in the information at the downstream location so as to verify the presence of the communication channel at the downstream location.

27. The method of claim 21 wherein the communications channel comprises an upstream location and a downstream location, the upstream and downstream locations being located between the transmitter and the receiver, with the information propagating from the upstream location to the downstream location, further comprising the steps of:

a) said step of incrementally introducing a variation into the information further comprises the step of incrementally introducing a variation into the information at the upstream location;

b) removing the variation in the information at the downstream location and passing the information on to the receiver along the communications channel.

28. The method of claim 21 wherein there is a second communications channel, the first and second communications channel comprising an upstream location and a downstream location, the upstream and downstream locations being located between the transmitter and the receiver, with the information propagating from the upstream location to the downstream location, for comprising the steps of:

a) coupling the first communications channel to the second communications channel at the upstream and downstream locations, while passing the information along the first communications channel between the upstream and downstream locations;

b) passing the information along the second communications channel between the upstream and downstream locations;

c) said step of incrementally introducing a variation into the information further comprises the step of incrementally introducing a variation into the information on the first communications channel at the upstream location;

d) adjusting the variation so as to match the arrival of the pulses on the first communication channel to the arrival of the pulses on the second communications channel at the downstream location;

e) transferring the information from the first communications channel to the second communications channel and allowing the information that passes along the second communications channel to be received by the receiver;

f) severing the first communications channel.

* * * * *